(12) United States Patent
Tyson

(10) Patent No.: X8154
(45) Date of Patent: Apr. 18, 1834

(54) FURNACE, BLAST

(76) Inventor: Isaac Tyson Jr.

Isaac Tyson Jr. of Baltimore Maryland
Letters Patent

The Schedule referred to in these Letters Patent and making part of the same containing a description in the words of the said Isaac Tyson Jr himself of his improvement in the mode of heating and applying heated air to Blast furnaces &c To all whom it may concern; Be it known that I Isaac Tyson Jr of the City of Baltimore have invented an improvement in the mode of heating and applying heated air to Blast furnaces in metallurgical operations. and I do hereby declare that the following is a full and exact description thereof. It is a well established fact that great advantage is derived from heating the air which is to be supplied to furnaces for smelting and other operations in metalurgy, requiring high degrees of heat, and my invention or discovery consists in a mode of taking advantage of this principle in a new way which will admit of the employment of anthracite coal so as to supply a large portion of the heat required and a consequent and great diminution of the proportionate quantity of the Charcoal or coke usually employed. The form of the apparatus which I employ will admit of considerable variety. I do not therefore confine myself to that particular modification which I am about to describe as I have chosen this on account of its simplicity to exemplify the principle upon which my invention is dependent. I construct a cylinder of cast or wrought iron of such dimensions as must be determined by the size of the furnace to be supplied and the degree of temperature to which it is determined to heat the air. This cylinder I place vertically and make one opening in the side thereof for the admission of air from the blowing apparatus, and another for the conveyance of the heated air into the furnace placing them in such positions as shall cause the air in its passage from one to the other to be subjected to the heating influence of the ignited fuel which is contained within the cylinder. This cylinder I line with fire brick or other non conductor of heat suitable for the purpose, and within it I place a grate to contain the
ignited fuel which is to heat the air. This grate may ... extend ... across
the entire cylinder so as to support the fuel it may be situated in any
convenient part of it between the pipes for the ingress and egress of the
air. Proper openings must of coarse be made in the cylinder for the
supply of fuel which may be contained in a reservoir so as to be heat-
ed before it is introduced the modes of effecting which are known
to those conversant with furnaces. Sometimes I intend to enclose
a second cylinder within the former, which second cylinder is to contain
the fuel leaving a space between the two for the circulation of air.
This second cylinder is to be open at top for the introduction of
the fuel. the space between it and the outer one being permanently closed
it may reach down to the bottom of the outer cylinder or nearly so.
The upper part of it say for half its length more or less may
be made without openings, whilst the lower part is to be formed into
bars or otherwise perforated in the manner of a grate.
When filled with fuel an air tight cover is placed upon it being made close by luting
or otherwise. The upper part of this cylinder serves as a reservoir for
fuel and to adapt it to this purpose more fully it may be extended
to any convenient height above the outer cylinder. Instead of
allowing the pipe through which the blast is introduced to terminate
at the inner surface of the outer cylinder, I intend sometimes to
conduct it across the space between the two and into the inner
cylinder within which the fuel is contained. governing myself in
this and other points by the degree to which I may find it desirable
to heat the air. Although I do not intend to confine myself to the
employment of anthracite coal in my heater, yet it is my design in
most cases to use it exclusively. believing that one of the great advan
tages in my invention will consist in so doing and that by heating
the air therewith I may diminish the quantity of charcoal or coke
to such an extent as only to require such a quantity to be mixed with
the ores or metallic matter as will be necessary to keep up the ignition
and to produce the requisite chemical action. What I claim as

United States Patent

Patent No.: X8154 my invention and for which I ask a patent is the heating of the air which is to be applied to a blast or other furnace in a separate vessel in which it is to be brought wholly or partially into contact with ignited fuel upon the principle or in the manner herein before set forth whether the same be done precisely in the way described or in any other in which the same effects are produced by analogous [illegible] means Witnesses
Thos. P. Jones
J. B. Wakeman Drawing Isaac Tyson Jr (925 words)

(Granted April 18. 1834)